US011964341B2

(12) United States Patent
Grapov et al.

(10) Patent No.: US 11,964,341 B2
(45) Date of Patent: Apr. 23, 2024

(54) LASER WELDING HEAD WITH DUAL MOVABLE MIRRORS PROVIDING BEAM MOVEMENT AND LASER WELDING SYSTEMS AND METHODS USING SAME

(71) Applicant: IPG PHOTONICS CORPORATION, Oxford, MA (US)

(72) Inventors: Yuri Grapov, Sutton, MA (US); Kris Pruyn, Tyngsboro, MA (US); Felix Stukalin, Southborough, MA (US); Erik Hinrichsen, Brighton, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 737 days.

(21) Appl. No.: 16/996,888

(22) Filed: Aug. 18, 2020

(65) Prior Publication Data

US 2020/0376594 A1   Dec. 3, 2020

Related U.S. Application Data

(63) Continuation of application No. 15/187,235, filed on Jun. 20, 2016, now Pat. No. 10,751,835.
(Continued)

(51) Int. Cl.
*B23K 26/082* (2014.01)
*B23K 26/03* (2006.01)
(Continued)

(52) U.S. Cl.
CPC .......... *B23K 26/082* (2015.10); *B23K 26/032* (2013.01); *B23K 26/044* (2015.10);
(Continued)

(58) Field of Classification Search
None
See application file for complete search history.

(56) References Cited

U.S. PATENT DOCUMENTS

| 3,471,215 A | 10/1969 | Snitzer |
| 4,614,868 A | 9/1986 | Alster |

(Continued)

FOREIGN PATENT DOCUMENTS

| EP | 2708307 A1 | 3/2014 |
| JP | 08192286 A | 7/1996 |

(Continued)

OTHER PUBLICATIONS

Machine translation of JP-2011189407-A, Mar. 2023.*
(Continued)

*Primary Examiner* — Geoffrey S Evans
(74) *Attorney, Agent, or Firm* — Grossman, Tucker, Perreault & Pfleger, PLLC

(57) ABSTRACT

A laser welding head with movable mirrors may be used to perform welding operations, for example, with wobble patterns and/or seam finding/tracking and following. The movable mirrors provide a wobbling movement of one or more beams within a relatively small field of view, for example, defined by a scan angle of 1-2°. The movable mirrors may be galvanometer mirrors that are controllable by a control system including a galvo controller. The laser welding head may also include a diffractive optical element to shape the beam or beams being moved. The control system may also be used to control the fiber laser, for example, in response to the position of the beams relative to the workpiece and/or a sensed condition in the welding head such as a thermal condition proximate one of the mirrors.

19 Claims, 11 Drawing Sheets

Related U.S. Application Data

(60) Provisional application No. 62/182,211, filed on Jun. 19, 2015, provisional application No. 62/294,731, filed on Feb. 12, 2016.

(51) Int. Cl.

| | |
|---|---|
| *B23K 26/044* | (2014.01) |
| *B23K 26/067* | (2006.01) |
| *B23K 26/242* | (2014.01) |
| *G02B 26/10* | (2006.01) |
| *G02B 27/09* | (2006.01) |
| *G02B 27/30* | (2006.01) |
| *G02B 27/40* | (2006.01) |

(52) U.S. Cl.
CPC ........ *B23K 26/0676* (2013.01); *B23K 26/242* (2015.10); *G02B 26/105* (2013.01); *G02B 27/0944* (2013.01); *G02B 27/30* (2013.01); *G02B 27/40* (2013.01)

(56) References Cited

U.S. PATENT DOCUMENTS

| | | | |
|---|---|---|---|
| 5,153,409 A | 10/1992 | Rudaitis et al. | |
| 5,249,192 A | 9/1993 | Kuizenga et al. | |
| 5,302,802 A * | 4/1994 | Fujinaga | B23K 26/0884 219/121.74 |
| 5,991,319 A | 11/1999 | Zamel et al. | |
| 6,974,930 B2 * | 12/2005 | Jense | B23K 26/046 359/201.1 |
| 7,786,404 B2 * | 8/2010 | Menin | B23K 26/082 219/121.64 |
| 8,498,037 B2 | 7/2013 | Andreasch et al. | |
| 2003/0055413 A1 | 3/2003 | Altshuler | |
| 2007/0075054 A1 * | 4/2007 | Nakamura | B23K 26/04 219/121.61 |
| 2007/0210040 A1 | 9/2007 | Sakamoto et al. | |
| 2007/0221639 A1 * | 9/2007 | Yoshikawa | B23K 26/064 219/121.75 |
| 2008/0049285 A1 | 2/2008 | Pinard et al. | |
| 2009/0032713 A1 | 2/2009 | Bhatia | |
| 2009/0206066 A1 | 8/2009 | Rekowski | |
| 2009/0266801 A1 | 10/2009 | Oku | |
| 2010/0072180 A1 | 3/2010 | Schuermann | |
| 2011/0297654 A1 | 12/2011 | Yoshikawa et al. | |
| 2012/0045169 A1 | 2/2012 | Hu | |
| 2014/0263207 A1 | 9/2014 | Liu | |
| 2014/0291304 A1 | 10/2014 | Mudd, II | |

FOREIGN PATENT DOCUMENTS

| | | | |
|---|---|---|---|
| JP | 2000-263276 A | | 9/2000 |
| JP | 3126788 | | 11/2000 |
| JP | 2007268610 | | 10/2007 |
| JP | 2010501354 | | 1/2010 |
| JP | 2010-162561 | | 7/2010 |
| JP | 2011-173146 | | 9/2011 |
| JP | 2011189407 A | * | 9/2011 |
| JP | 2012024808 A | | 2/2012 |
| JP | 2012110905 | | 6/2012 |
| JP | 2005279730 | | 10/2013 |
| JP | 2014-046330 A | | 3/2014 |
| JP | 2015157297 | | 9/2015 |
| JP | 2014046330 | | 3/2017 |
| KR | 20110029344 A | * | 3/2011 |
| KR | 20130047506 A | * | 5/2011 |
| WO | 2009-146697 | | 12/2009 |
| WO | 2014138939 | | 9/2014 |

OTHER PUBLICATIONS

Machine translation of KR-20110029344-A, Mar. 2023.*
Machine translation of KR-20130047506-A, Mar. 2023.*
Kraetsch, M. et al. "Laser Beam Welding with High-Frequency Beam Oscillation: Welding of Dissimilar Materials With Brilliant Fiber Lasers" ICALEO 2011, 169 (2011).
Notice of Opposition filed by Becker, Bernhard dated Mar. 30, 2022.
Notice of Opposition filed by Becker, Bernhard dated Mar. 30, 2022 in corresponding European patent application No. 3310518B1. English translation.
Communication from US Patent Office dated Jul. 2, 2019 regarding third-party submission under 37 CFR 1.290 received (2 pages).
Third-Party Submission Under 37 CFR 1.290 filed Jun. 27, 2019 in U.S. Appl. No. 16/076,151 (2 pgs); Third-Party Submission Under 37 CFR 1.290 Concise Description of Relevance (3 pgs); Third-Party Pre-Issuance Submission (33 pgs); and receipt of filing (3 pgs).
Cindy Goppold, Thomas Pinder and Patrick Herwig of Fraunhofer IWS, De Gruyter, Advanced Optical Technologies, vol. 5, Issue 1, pp. 61-70, published online on Feb. 4, 2016 (see https://www.degruyter.com/view/j/aot.2016.5.issue-1/aot-2015-0059/aot-2015-0059.XML?format=INT).
Restriction Requirement in related U.S. Appl. No. 15/187,235, dated Oct. 3, 2018 (6 pages).
Office Action in related U.S. Appl. No. 15/187,235, dated Apr. 2, 2019 (24 pages).
European Communication dated Apr. 4, 2019 in connection with correspondence European Patent Application Serial No. 16812628.2 (155 pages).
PCT International Search Report and Written Opinion dated Oct. 27, 2016, received in corresponding PCT Application No. PCT/US16/38382, 11 pgs.
Notice of Allowance n related U.S. Appl. No. 15/187,235, dated Apr. 20, 2020 (11 pages).
Comments on Office Action from related JP application No. 2017-565705, dated Apr. 19, 2021 (13 pages).
Japanese Office Action dated Feb. 15, 2021 in corresponding Japanese Patent Application No. 2018-542142.

* cited by examiner

LASER WELDING HEAD WITH DUAL MOVABLE MIRRORS PROVIDING BEAM MOVEMENT AND LASER WELDING SYSTEMS AND METHODS USING SAME

CROSS-REFERENCE TO RELATED APPLICATIONS

This application is a continuation of U.S. patent application Ser. No. 15/187,235 filed Jun. 20, 2016, now U.S. Pat. No. 10,751,835, which claims the benefit of U.S. Provisional Patent Application Ser. No. 62/182,211 filed on Jun. 19, 2015 and U.S. Provisional Patent Application Ser. No. 62/294,731 filed on Feb. 12, 2016, both of which are fully incorporated herein by reference.

TECHNICAL FIELD

The present invention relates to laser welding and more particularly, to a laser welding head with dual movable mirrors providing beam movement and laser welding systems and methods using same.

BACKGROUND INFORMATION

Lasers such as fiber lasers are often used for materials processing applications such as welding. A conventional laser welding head includes a collimator for collimating laser light and a focus lens for focusing the laser light to a target area to be welded. The beam may be moved in various patterns to facilitate welding two structures along a seam, for example, using a stir welding technique. One way to move the beam for stir welding is to rotate the beam using rotating prism optics to form a rotating or spiral pattern. Another way to move a beam for welding is to pivot or move the entire weld head on an X-Y stage to form a zig zag pattern. These conventional methods of moving the beam to perform weld patterns do not allow quick and precise movements of the beam.

SUMMARY

Consistent with an embodiment, a laser welding head includes a collimator configured to be coupled to an output fiber of a fiber laser and at least first and second movable mirrors configured to receive a collimated laser beam from the collimator and to move the beam in first and second axes within only a limited field of view defined by a scan angle of about 1-2°. The laser welding head also includes a focus lens configured to focus the laser beam relative to a workpiece while the beam is moved.

Consistent with another embodiment, a laser welding head includes a collimator configured to be coupled to an output fiber of a fiber laser, at least first and second movable mirrors configured to receive a collimated laser beam from the collimator and to move the beam in first and second axes, and at least first and second thermal sensors proximate the first and second movable mirrors, respectively, and configured to detect a thermal condition. The laser welding head also includes a focus lens configured to focus the laser beam.

Consistent with a further embodiment, a laser welding head includes a collimator module including a collimator configured to be coupled to an output fiber of a fiber laser and a wobbler module coupled to the collimator module. The wobbler module includes at least first and second movable mirrors configured to receive a collimated laser beam from the collimator and to move the beam in first and second axes. The laser welding head also includes a core block module coupled to the wobbler module. The core block module includes at least a focus lens configured to focus the laser beam.

Consistent with yet another embodiment, a laser welding system includes a fiber laser including an output fiber and a welding head coupled to the output fiber of the fiber laser. The welding head includes a collimator configured to be coupled to an output fiber of a fiber laser, at least first and second movable mirrors configured to receive a collimated laser beam from the collimator and to move the beam in first and second axes, and a focus lens configured to focus the laser beam. The laser welding system also includes a control system for controlling at least the fiber laser and positions of the mirrors.

Consistent with yet another embodiment, a laser welding head includes a collimator configured to be coupled to an output fiber of a fiber laser, at least first and second movable mirrors configured to receive a collimated laser beam from the collimator and to move the beam in first and second axes, and a focus lens configured to focus the laser beam. The laser welding head also includes at least one of a gas assist accessory and an air knife accessory proximate the focus lens to assist welding.

Consistent with yet another embodiment, a laser welding head includes a collimator configured to be coupled to an output fiber of a fiber laser, at least one diffractive optical element configured to receive a collimated laser beam from the collimator and to shape the collimated laser beam, and at least first and second movable mirrors configured to receive a shaped laser beam from the diffractive optical element and to move the shaped beam in first and second axes. The laser welding head also includes a focus lens configured to focus the laser beam relative to a workpiece while the beam is moved.

BRIEF DESCRIPTION OF THE DRAWINGS

These and other features and advantages will be better understood by reading the following detailed description, taken together with the drawings wherein.

DETAILED DESCRIPTION

A laser welding head with movable mirrors, consistent with embodiments of the present disclosure, may be used to perform welding operations, for example, with wobble patterns and/or seam finding/tracking and following. The movable mirrors provide a wobbling movement of one or more beams within a relatively small field of view, for example, defined by a scan angle of 1-2°. The movable mirrors may be galvanometer mirrors that are controllable by a control system including a galvo controller. The laser welding head may also include a diffractive optical element to shape the beam or beams being moved. The control system may also be used to control the fiber laser, for example, in response to the position of the beams relative to the workpiece and/or a sensed condition in the welding head such as a thermal condition proximate one of the mirrors.

Figure 1:
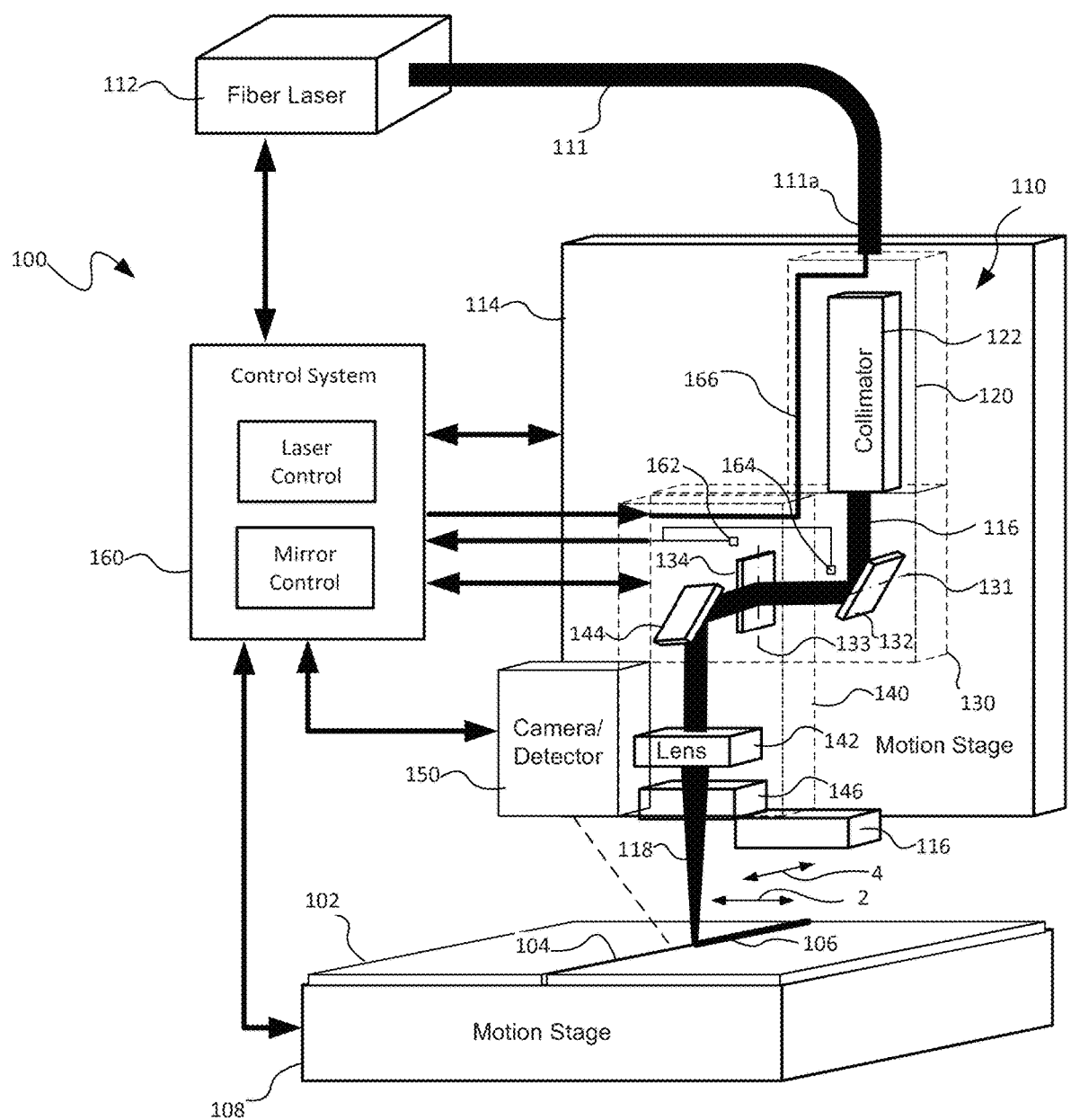
FIG. 1 is a schematic block diagram of a system including a laser welding head with dual movable mirrors, consistent with an embodiment of the present disclosure.

Referring to FIG. 1, a laser welding system 100 includes a laser welding head 110 coupled to an output fiber 111 of a fiber laser 112 (e.g., with a connector 111a). The laser welding head 110 may be used to perform welding on a workpiece 102, for example, by welding a seam 104 to form a weld bead 106. The laser welding head 110 and/or the workpiece 102 may be moved relative to each other along the direction of the seam 104. The laser welding head 110 may be located on a motion stage 114 for moving the welding head 110 relative to the workpiece 102 along at least one axis, for example, along the length of the seam 104. Additionally or alternatively, the workpiece 102 may be located on a motion stage 108 for moving the workpiece 102 relative to the laser welding head 110.

The fiber laser 112 may include an Ytterbium fiber laser capable of generating a laser in the near infrared spectral range (e.g., 1060-1080 nm). The Ytterbium fiber laser may be a single mode or multi-mode continuous wave Ytterbum fiber laser capable of generating a laser beam with power up to 1 kW in some embodiments and higher powers up to 50 kW in other embodiments. Examples of the fiber laser 112 include the YLR SM Series or YLR HP Series lasers available from IPG Photonics Corporation. The fiber laser 112 may also include a multi-beam fiber laser, such as the type disclosed in International Application No. PCT/US2015/45037 filed 13 Aug. 2015 and entitled Multibeam Fiber Laser System, which is capable of selectively delivering one or more laser beams through multiple fibers.

The laser welding head 110 generally includes a collimator 122 for collimating the laser beam from the output fiber 111, at least first and second movable mirrors 132, 134 for reflecting and moving the collimated beam 116, and a focus lens 142 for focusing and delivering a focused beam 118 to the workpiece 102. In the illustrated embodiment, a fixed mirror 144 is also used to direct the collimated laser beam 116 from the second movable mirror 134 to the focus lens 142. The collimator 122, the movable mirrors 132, 134, and the focus lens 142 and fixed mirror 144 may be provided in separate modules 120, 130, 140 that may be coupled together, as will be described in greater detail below. The laser welding head 110 may also be constructed without the fixed mirror 144, for example, if the mirrors 132, 134 are arranged such that the light is reflected from the second mirror 134 toward the focus lens 142.

The movable mirrors 132, 134 are pivotable about different axes 131, 133 to cause the collimated beam 116 to move and thus to cause the focused beam 118 to move relative to the workpiece 102 in at least two different perpendicular axes 2, 4. The movable mirrors 132, 134 may be galvanometer mirrors that are movable by galvo motors, which are capable of reversing direction quickly. In other embodiments, other mechanisms may be used to move the mirrors such as stepper motors. Using the movable mirrors 132, 134 in the laser welding head 110 allows the laser beam 118 to be moved precisely, controllably and quickly for purposes of seam finding and following and/or beam wobbling without having to move the entire welding head 110 and without using rotating prisms.

Figure 1A:
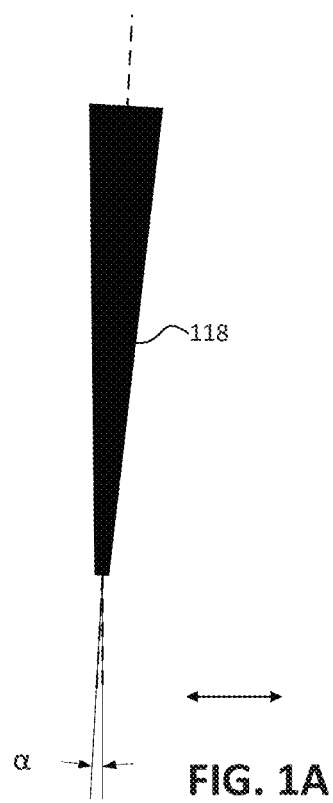
FIG. 1A is a schematic diagram of a focused laser beam with a relatively small range of movement provided by dual mirrors for purposes of seam finding and/or wobbling, consistent with an embodiment of the present disclosure.

In an embodiment of the welding head 110, movable mirrors 132, 134 move the beam 118 within only a relatively small field of view (e.g., less than 30×30 mm) by pivoting the beam 118 within a scan angle α of less than 10° and more particularly about 1-2°, as shown in FIG. 1A, thereby allowing the beam to wobble. In contrast, conventional laser scan heads generally provide movement of the laser beam within a much larger field of view (e.g., larger than 50×50 mm and as large as 250×250 mm) and are designed to accommodate the larger field of view and scan angle. Thus, the use of the movable mirrors 132, 134 to provide only a relatively small field of view in the laser welding head 110 is counter-intuitive and contrary to the conventional wisdom of providing a wider field of view when using galvo scanners. Limiting the field of view and the scan angle provides advantages when using galvo mirrors in the welding head 110, for example, by enabling faster speeds, allowing use with less expensive components such as lenses, and by allowing use with accessories such as air knife and/or gas assist accessories.

Because of the smaller field of view and scan angle in the example embodiment of the welding head 110, the second mirror 134 may be substantially the same size as the first mirror 132. In contrast, conventional galvo scanners generally use a larger second mirror to provide for the larger field of view and scan angle and the larger second mirror may limit the speed of movement in at least one axis. A smaller sized second mirror 134 (e.g., about the same size as the first mirror 132) in the welding head 110 thus enables the mirror 134 to move with faster speeds as compared to larger mirrors in conventional galvo scanners providing large scan angles.

The focus lens 142 may include focus lenses known for use in laser welding heads and having a variety of focal lengths ranging, for example, from 100 mm to 1000 mm. Conventional laser scan heads use multi-element scanning lenses, such as an F theta lens, a field flattening lens, or a telecentric lens, with much larger diameters (e.g., a 300 mm diameter lens for a 33 mm diameter beam) to focus the beam within the larger field of view. Because the movable mirrors 132, 134 are moving the beam within a relatively small field of view, a larger multi-element scanning lens (e.g., an F theta lens) is not required and not used. In one example embodiment of the welding head 110 consistent with the present disclosure, a 50 mm diameter plano convex F300 focus lens may be used to focus a beam having a diameter of about 40 mm for movement within a field of view of about 15×5 mm. The use of the smaller focus lens 142 also allows additional accessories, such as air knife and/or gas assist accessories, to be used at the end of the welding head 110. The larger scanning lenses required for conventional laser scan heads limited the use of such accessories.

Other optical components may also be used in the laser welding head 110 such as a beam splitter for splitting the laser beam to provide at least two beam spots for welding (e.g., on either side of the weld). Additional optical components may also include diffractive optics and may be positioned between the collimator 122 and the mirrors 132, 134, as will be described in greater detail below.

A protective window 146 may be provided in front of the lens 142 to protect the lens and other optics from the debris produced by the welding process. The laser welding head 110 may also include a welding head accessory 116, such as an air knife for providing high velocity air flow across the protective window 146 or focus lens 142 to remove the debris and/or a gas assist accessory to deliver shield gas coaxially or off-axis to the weld site to suppress weld plume. Thus, the laser welding head 110 with movable mirrors is capable of being used with existing welding head accessories.

The illustrated embodiment of the laser welding system 100 also includes a detector 150, such as a camera, for detecting and locating the seam 104, for example, at a location in advance of the beam 118. Although the camera/detector 150 is shown schematically at one side of the welding head 110, the camera/detector 150 may be directed through the welding head 110 to detect and locate the seam 104.

The illustrated embodiment of the laser welding system 100 further includes a control system 160 for controlling the fiber laser 112, the positioning of the movable mirrors 132, 134, and/or the motion stages 108, 114, for example, in response to sensed conditions in the welding head 110, a detected location of the seam 104, and/or movement and/or a position of the laser beam 118. The laser welding head 110 may include sensors such as first and second thermal sensors 162, 164 proximate the respective first and second movable mirrors 132, 134 to sense thermal conditions. The control system 160 is electrically connected to the sensors 162, 164 for receiving data to monitor the thermal conditions proximate the movable mirrors 132, 134. The control system 160 may also monitor the welding operation by receiving data from the camera/detector 150, for example, representing a detected location of the seam 104.

The control system 160 may control the fiber laser 112, for example, by shutting off the laser, changing the laser parameters (e.g., laser power), or adjusting any other adjustable laser parameter. The control system 160 may cause the fiber laser 112 to shut off in response to a sensed condition in the laser welding head 110. The sensed condition may be a thermal condition sensed by one or both of the sensors 162, 164 and indicative of a mirror malfunction resulting in high temperatures or other conditions caused by the high power laser.

The control system 160 may cause the fiber laser 112 to shut off by triggering a safety interlock. A safety interlock is configured between the output fiber 111 and the collimator 122 such that the safety interlock condition is triggered and the laser is shut off when the output fiber 111 is disconnected from the collimator 122. In the illustrated embodiment, the laser welding head 110 includes an interlock path 166 that extends the safety interlock feature to the movable mirrors 132, 134. The interlock path 166 extends between the output fiber 111 and the control system 160 to allow the control system 160 to trigger the safety interlock condition in response to potentially hazardous conditions detected in the laser welding head 110. In this embodiment, the control system 160 may cause the safety interlock condition to be triggered via the interlock path 166 in response to a predefined thermal condition detected by one or both sensors 162, 164.

The control system 160 may also control the laser parameters (e.g., laser power) in response to movement or a position of the beam 118 without turning off the laser 112. If one of the movable mirrors 132, 134 moves the beam 118 out of range or too slowly, the control system 160 may reduce the laser power to control the energy of the beam spot dynamically to avoid damage by the laser. The control system 160 may further control selection of laser beams in a multi-beam fiber laser.

The control system 160 may also control the positioning of the movable mirrors 132, 134 in response to the detected location of the seam 104 from the camera/detector 150, for example, to correct the position of the focused beam 118 to find, track and/or follow the seam 104. The control system 160 may find the seam 104 by identifying a location of the seam 104 using the data from the camera/detector 150 and then moving one or both of the mirrors 132, 134 until the beam 118 coincides with the seam 104. The control system 160 may follow the seam 104 by moving one or both of the mirrors 132, 134 to adjust or correct the position of the beam 118 continuously such that the beam coincides with the seam 104 as the beam 118 moves along the seam to perform the weld. The control system 160 may also control one or both of the movable mirrors 132, 134 to provide the wobble movement during welding, as described in greater detail below.

The control system 160 thus includes both laser control and mirror control working together to control both the laser and the mirrors together. The control system 160 may include, for example, hardware (e.g., a general purpose computer) and software known for use in controlling fiber lasers and galvo mirrors. Existing galvo control software may be used, for example, and modified to allow the galvo mirrors to be controlled as described herein.

Figures 2A, 2B, 2C, 2D:
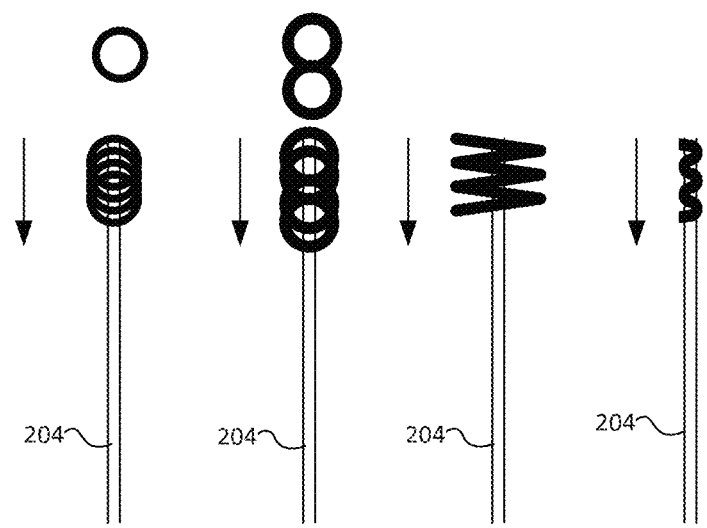
FIGS. 2A-2D are schematic diagrams illustrating different wobble patterns capable of being produced by a welding head including dual mirrors for beam movement, consistent with an embodiment of the present disclosure.

FIGS. 2A-2D illustrate examples of wobble patterns that may be used to perform stir welding of a seam 204. As used herein, "wobble" refers to reciprocating movement of a laser beam (e.g., in two axes) and within a relatively small field of view defined by a scan angle of less than 10°. FIGS. 2A and 2B show a circular pattern and a figure 8 pattern, respectively, being formed sequentially along the seam 204. FIGS. 2C and 2D show a zig-zag pattern and an undulating pattern, respectively, being formed along the seam 204. Although certain wobble patterns are illustrated, other wobble patterns are within the scope of the present disclosure. One advantage of using the movable mirrors in the laser welding head 110 is the ability to move the beam according to a variety of different wobble patterns.

Figure 3A:
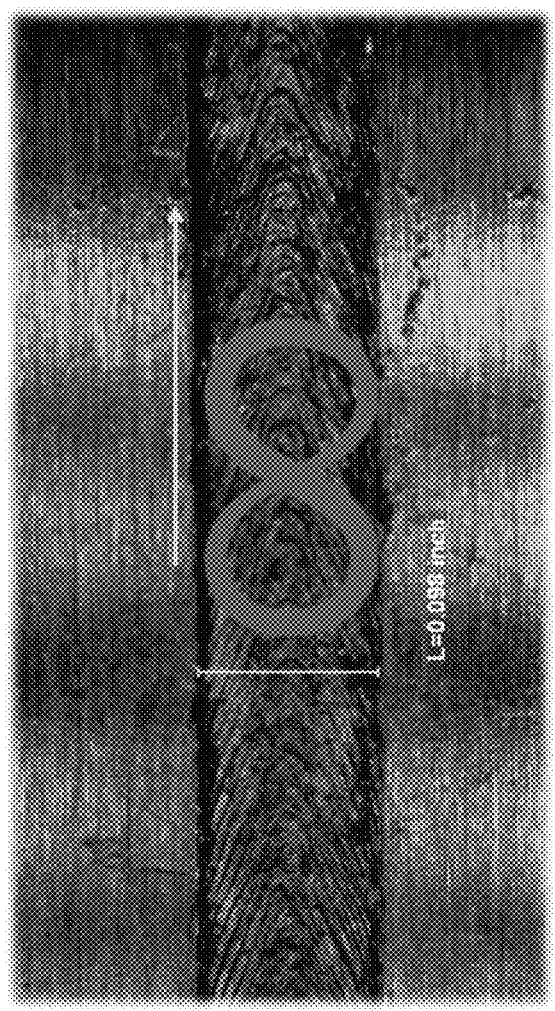
FIG. 3A is a micrograph of a welded workpiece with a weld bead formed by a laser using stir welding with a figure 8 wobble pattern, consistent with an embodiment of the present disclosure.
Figure 3B:
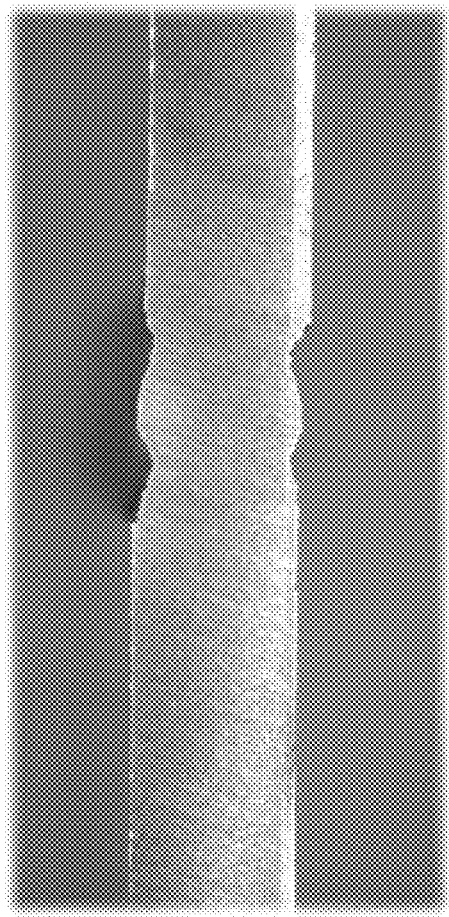
FIG. 3B is a micrograph of a cross-section of the welded workpiece and weld bead shown in FIG. 3A.
Figure 3C:
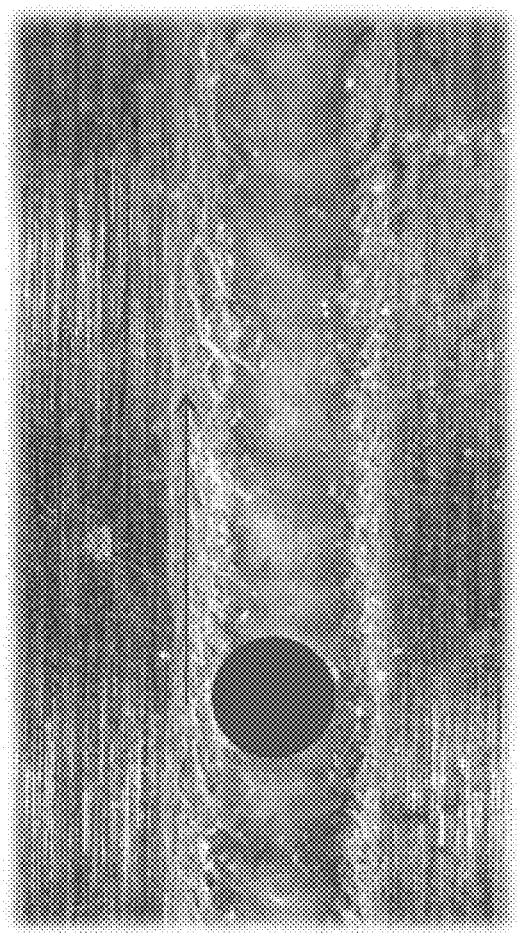
FIG. 3C is a micrograph of a welded workpiece with a weld bead formed by a laser without a wobble pattern.
Figure 3D:
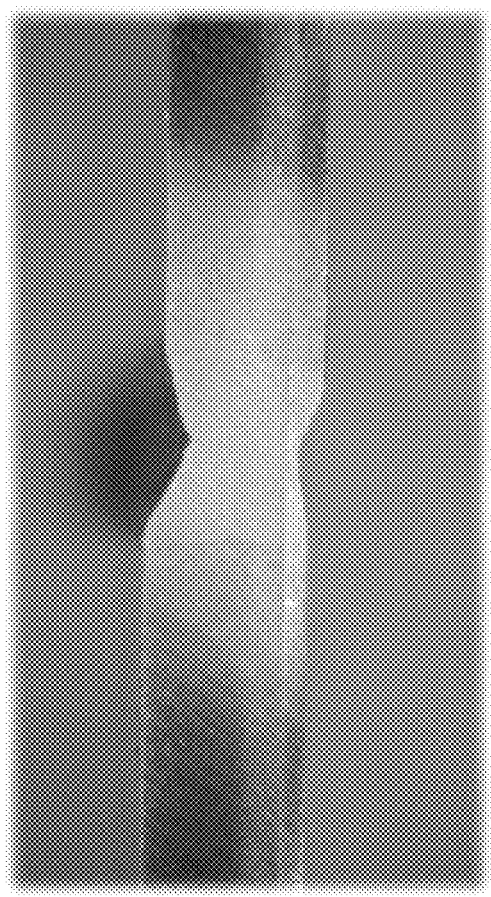
FIG. 3D is a micrograph of a cross-section of the welded workpiece and weld bead shown in FIG. 3C.
Figure 8:
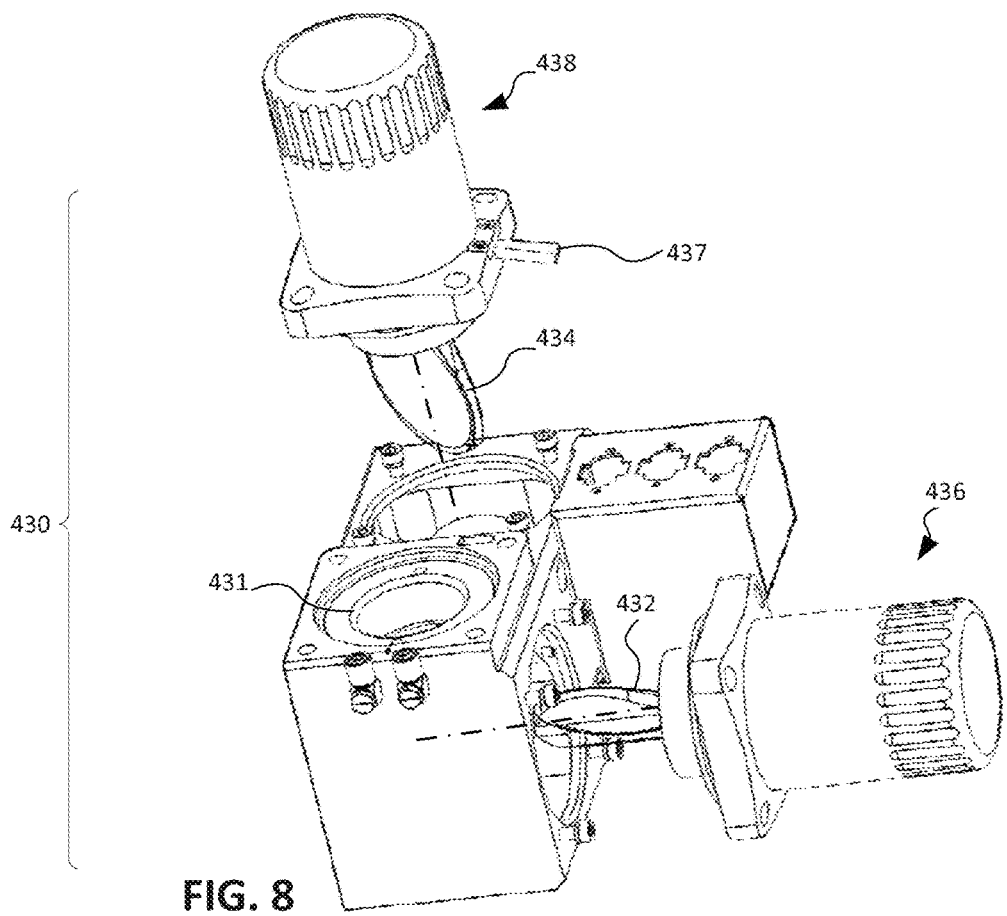
FIG. 8 is an exploded view of the wobbler module used in the laser welding head shown in FIG. 4.

FIGS. 3A-3D illustrate a comparison of welds formed on 6061 T6 Al by a figure 8 wobble pattern (FIGS. 3A and 3B) compared to a conventional non-manipulated beam (FIGS. 3C and 3D). In one example (FIGS. 3A and 3B), a two pieces of aluminum 6061-T6 alloy are welded with a 2 mm diameter beam spot moving with a figure 8 pattern at 90° with a 300 Hz wobble, a power of 2.75 kW, a speed of 3.5 m/min and with a 0.012 in. gap. In the other example (FIGS. 3C and 3D), two pieces of aluminum 6061-T6 alloy are welded with a beam spot with no wobble, a power of 2.0 kW, a speed of 3.5 m/min and with a 0.012 in. gap. As shown, the weld quality on the surface with the figure 8 wobble is improved as compared to the non-manipulated beam. In particular, uniformity through the weld is improved as shown in FIG. 3A compared to FIG. 3C. The cross section in FIG. 3B also shows less reduction in area at the weld (as compared to FIG. 3D), which is due to the figure 8 wobble pattern bridging the gap of the seam 204 more effectively. The laser welding systems and methods described herein may also be used to improve welding with materials, such as titanium, that are typically difficult to weld.

Figure 4:
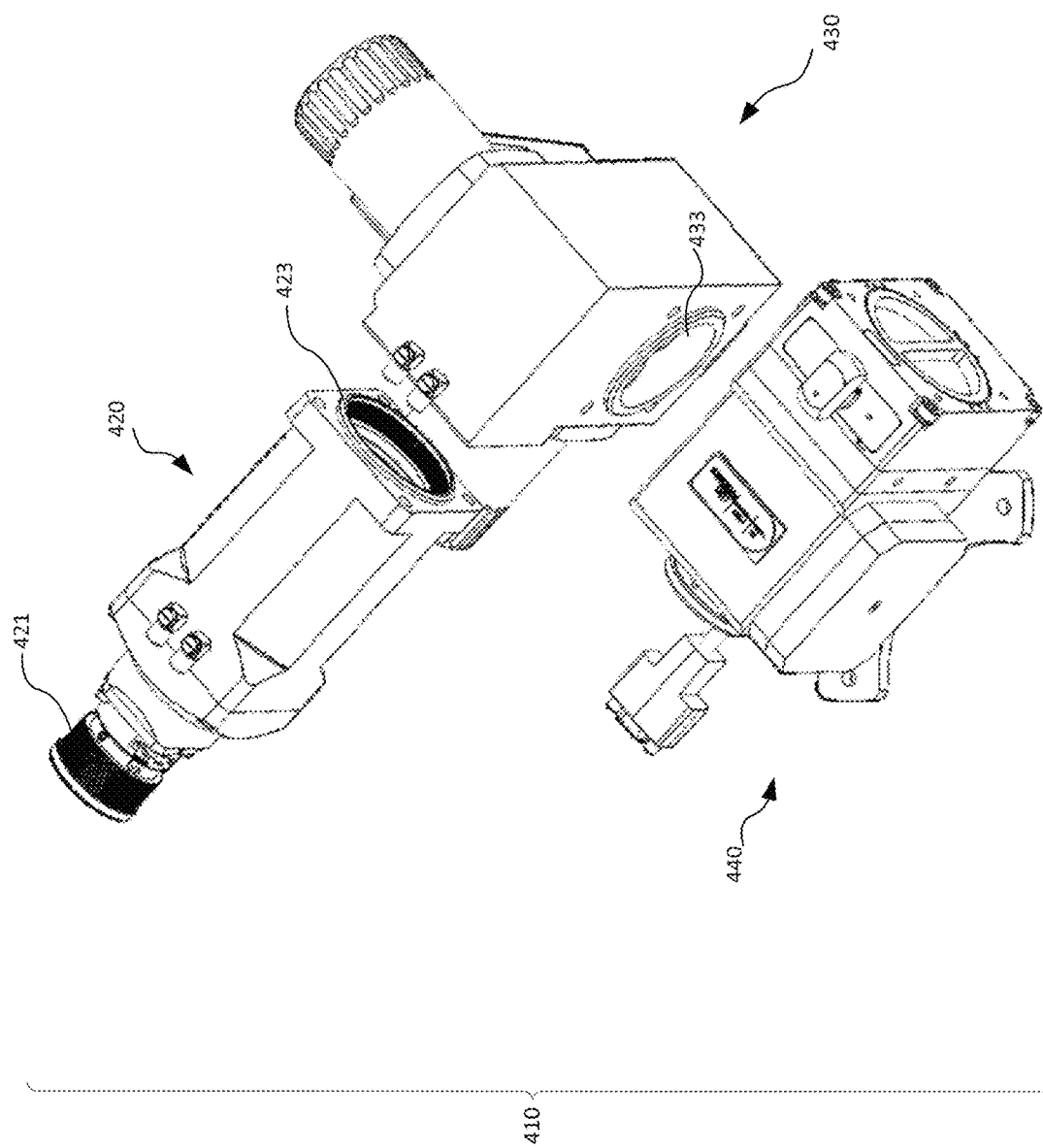
FIG. 4 is an exploded view of a laser welding head with dual movable mirrors for beam movement, consistent with an embodiment of the present disclosure.

FIGS. 4-15 illustrate an embodiment of the laser welding head 410 in greater detail. Although one specific embodiment is shown, other embodiments of the laser welding head and systems and methods described herein are within the scope of the present disclosure. As shown in FIG. 4, the laser welding head 410 includes a collimator module 420, a wobbler module 430, and a core block module 440. The wobbler module 430 includes the first and second movable mirrors as discussed above and is coupled between the collimator module 420 and the core block module 440.

Figure 5:
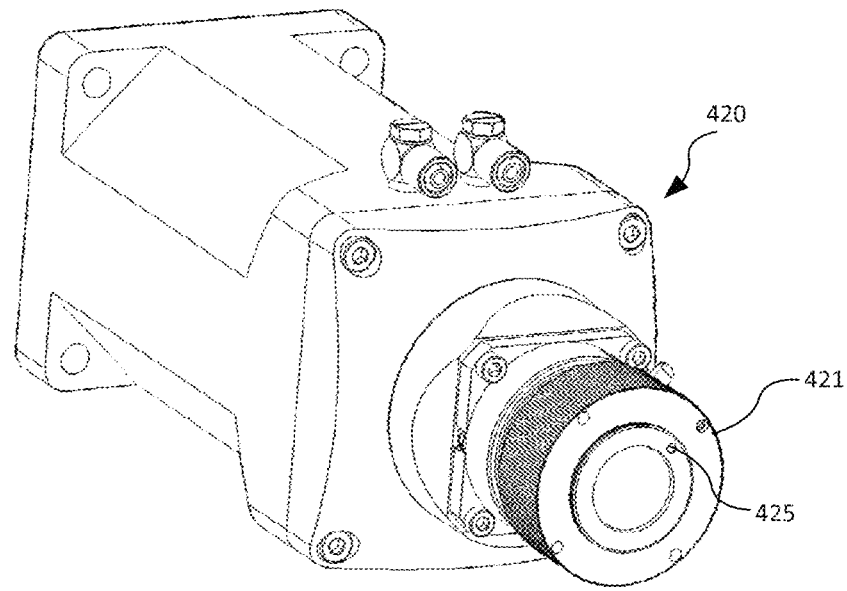
FIGS. 5 and 6 are perspective views of a collimator module used in the laser welding head shown in FIG. 4.
Figure 6:
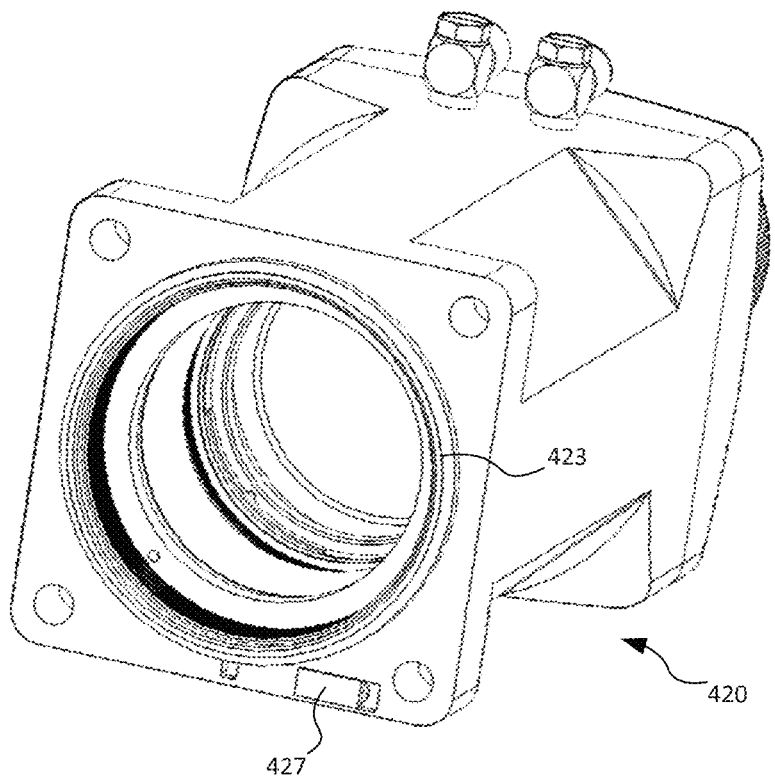

FIGS. 5 and 6 show the collimator module 420 in greater detail. As shown in FIG. 5, an input end 421 of the collimator module 420 is configured to be coupled to an output fiber connector and includes a fiber interlock connector 425 that connects to the output fiber connector (not shown) to provide a safety interlock for when the output fiber is disconnected. As shown in FIG. 6, an output end 423 of the collimator module 420 is configured to be coupled to the wobbler module 430 (see FIG. 4) and includes a fiber interlock connector 427 to extend the safety interlock path into the wobbler module 430. The collimator module 420 may include a collimator (not shown) with a fixed pair of collimator lenses such as the type known for use in laser welding heads. In other embodiments, the collimator may include other lens configurations, such as movable lenses, capable of adjusting the beam spot size and/or focal point.

FIGS. 7-10 show the wobbler module 430 in greater detail. The illustrated embodiment of the wobbler module 430 includes an input aperture 431 for coupling to the collimator module 420 and an output aperture 433 for coupling to the core block module 440 (see FIG. 4). The input aperture 431 may include a water cooled limiting aperture.

As shown in FIG. 8, the illustrated embodiment of the wobbler module 430 also includes first and second galvanometers 436, 438 for moving galvo mirrors 432, 434 about different perpendicular axes. Galvanometers known for use in laser scanning heads may be used. The galvanometers 436, 438 may include connections 437 for connecting to a galvo controller (not shown). The galvo controller may include hardware and/or software for controlling the galvanometers to control movement of the mirrors and thus movement and/or positioning of the laser beam. Known galvo control software may be used and may be modified to provide the functionality described herein, for example, the seam finding, the wobbler patterns, and communication with the laser.

Figure 7:
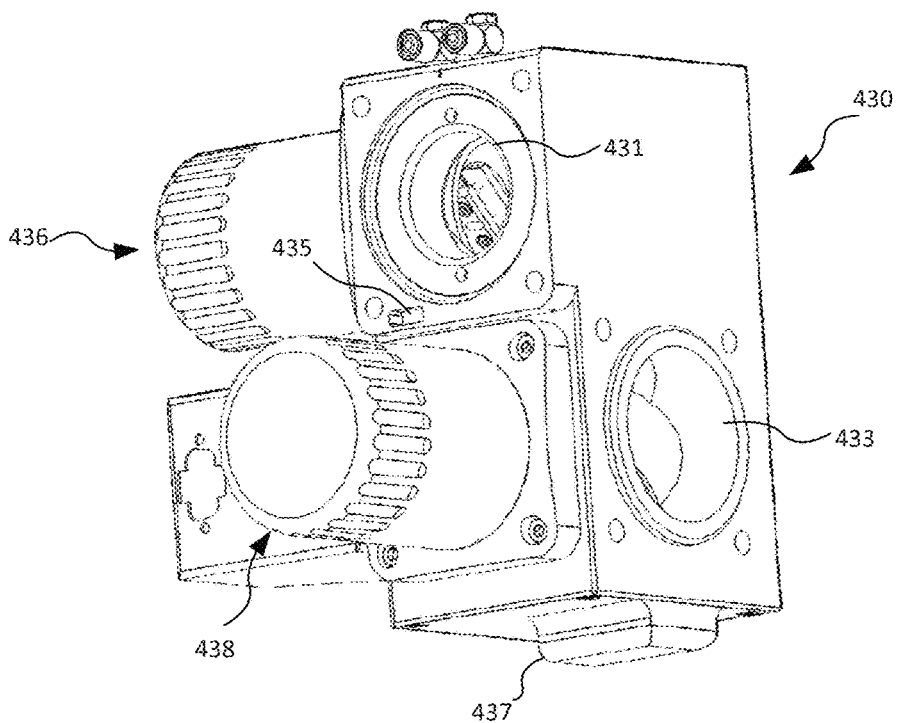
FIG. 7 is a perspective view of a wobbler module used in the laser welding head shown in FIG. 4.

As shown in FIG. 7, the wobbler module 430 includes a fiber interlock connector 435 for connecting to the collimator fiber interlock connector 427. The wobbler module 430 also includes a galvo fiber interlock connector 437 for connecting to the galvo controller. The safety interlock is thus extended to the wobbler module 430 and to the galvo controller. The galvo controller may be configured to trigger a safety interlock condition, for example, in response to sensed conditions within the wobbler module 430.

Figure 9:
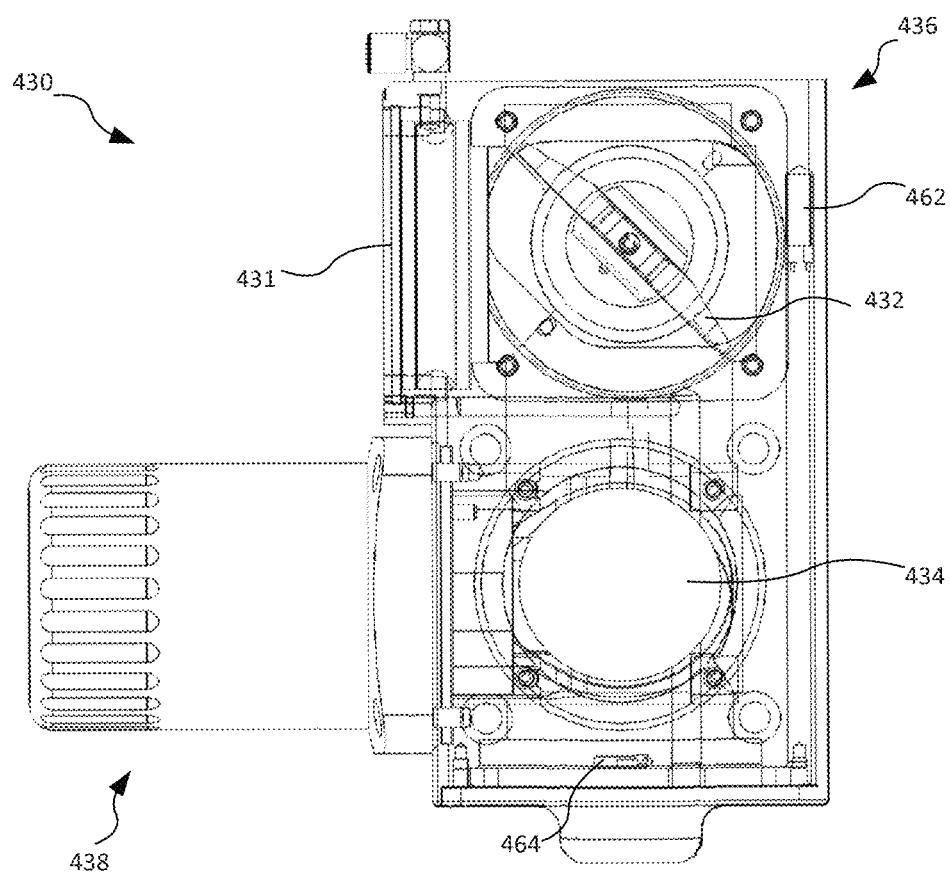
FIG. 9 is a partially cross-sectional side view of the wobbler module used in the laser welding head shown in FIG. 4.
Figure 10:
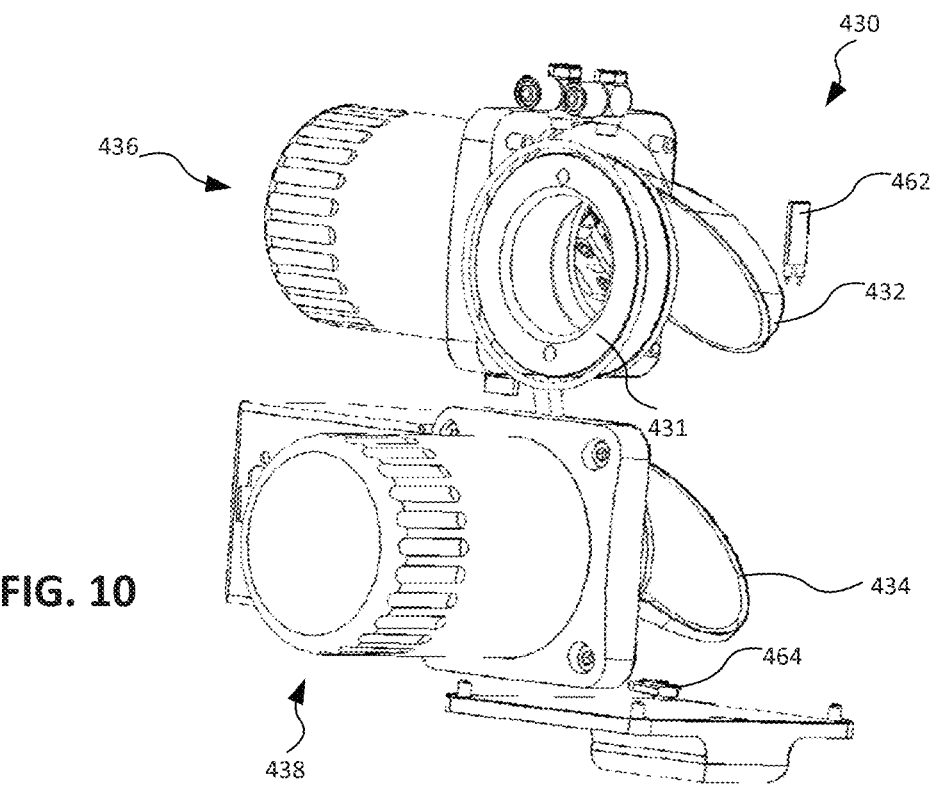
FIG. 10 is perspective view of the inside of the wobbler module with a water cooled limiting aperture and thermal sensors.

As shown in FIGS. 9 and 10, the wobbler module 430 includes thermal probes 462, 464 proximate each of the respective mirrors 432, 434. The thermal probes 462, 464 sense a thermal condition (e.g., temperature) at the respective locations within the wobbler module 430 and may be connected via the galvo connections 437 to the galvo controller. The galvo controller may thus monitor the thermal probes 462, 464 to determine if a predefined condition occurs, such as a high temperature indicating a potentially hazardous condition within the wobbler module 430. If one of the movable mirrors 432, 434 malfunctions, for example, the high power laser directed into the wobbler module 430 may not be reflected properly and may cause the hazardous condition. The galvo controller may thus trigger the safety interlock to shut down the laser in response to the hazardous condition. The thermal probes may include known sensors such as bimetal strips inside of ceramic.

Figure 11:
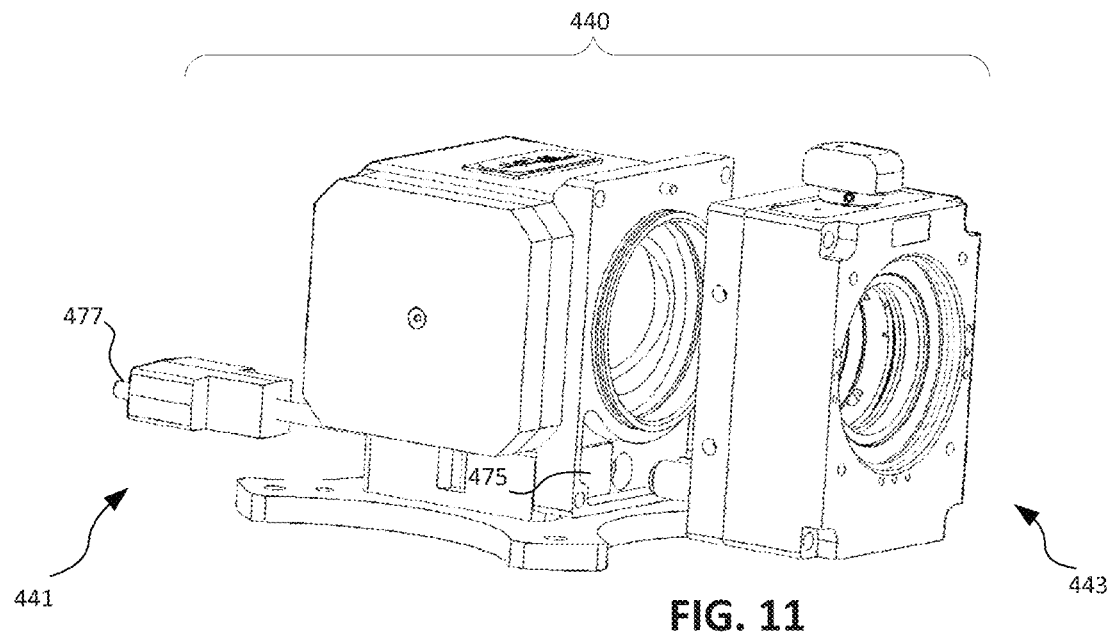
FIG. 11 is an exploded view of a core block module including a focus and window housing used in the laser welding head shown in FIG. 4.

FIG. 11 shows the core block module 440 in greater detail. The core block module 440 includes a fixed mirror (not shown) that redirects the beam received from the wobbler module 430 to a focus lens 442 and then to the workpiece. As shown, the core block module 440 includes a core block housing 441 and a focus and window housing 443 coupled to one side of the core block housing 441. A camera module (not shown) may be coupled to an opposite side of the core block housing 441 for monitoring the focused beam and/or the workpiece within the field of view provided through the focus and window housing 443.

Figure 12:
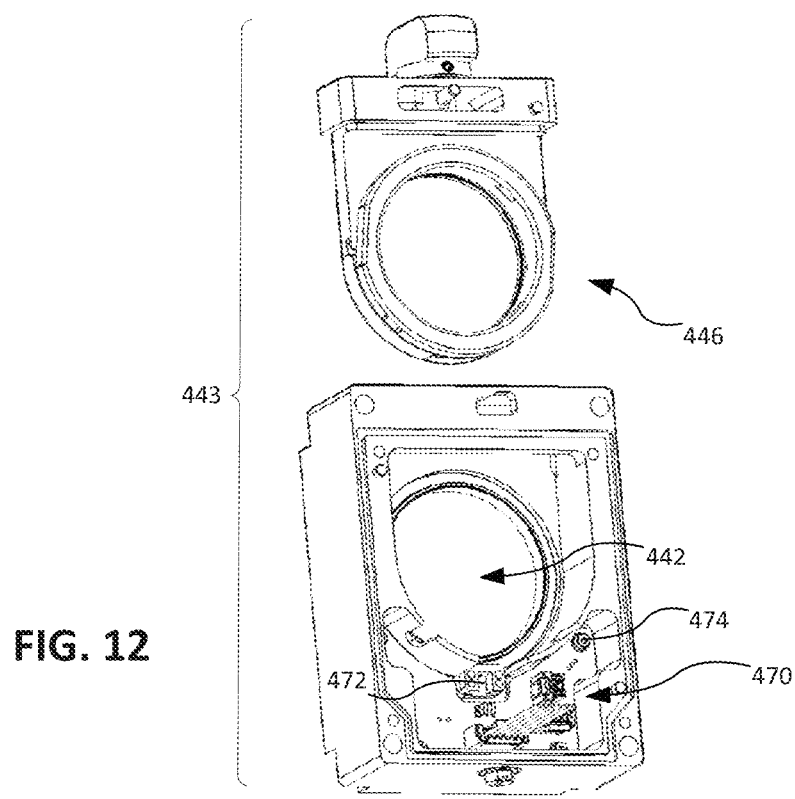
FIG. 12 is an exploded view of the focus and window housing with a protective window used in the laser welding head shown in FIG. 4.

The focus and window housing 443 contains the focus lens 442 and a protective window 446. As shown in FIG. 12, the protective window 446 may be removable and replaceable. The focus and window housing 443 also contains a window status monitoring circuit 470 with sensors such as a thermistor 472 and photodiode 474 to monitor a status of the protective window 446. The core block housing 441 further includes a status monitoring connector 475 for connecting to the status monitoring circuit 470 in the focus and window housing 443 and a welding monitor connector 477 for connecting to a welding head monitor (not shown).

Figure 14:
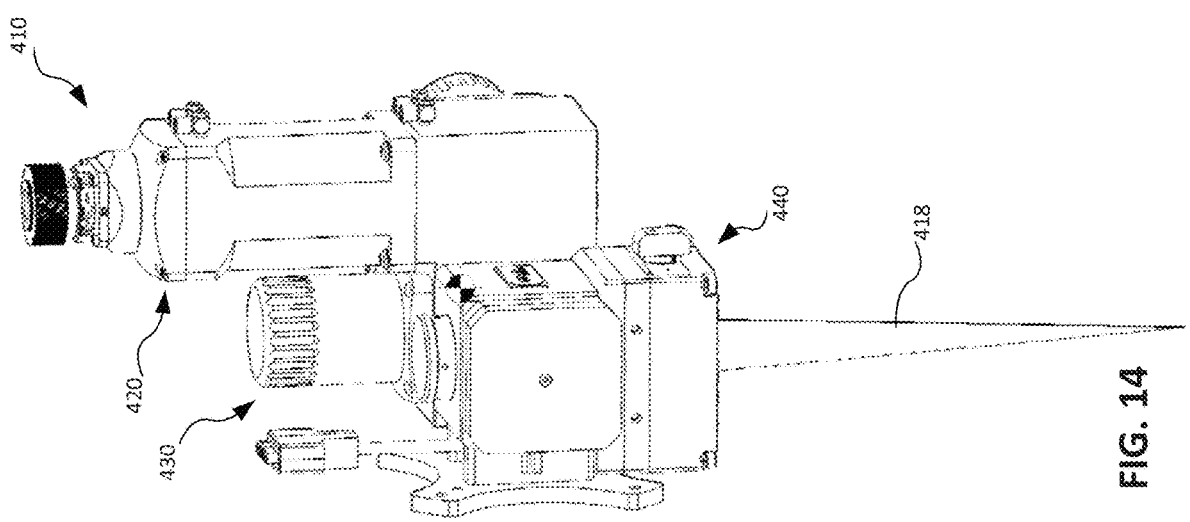
FIGS. 13 and 14 are perspective views of the laser welding head shown in FIG. 4 with the collimator module, wobbler module, and core block module assembled together and emitting a focused beam.
Figure 13:
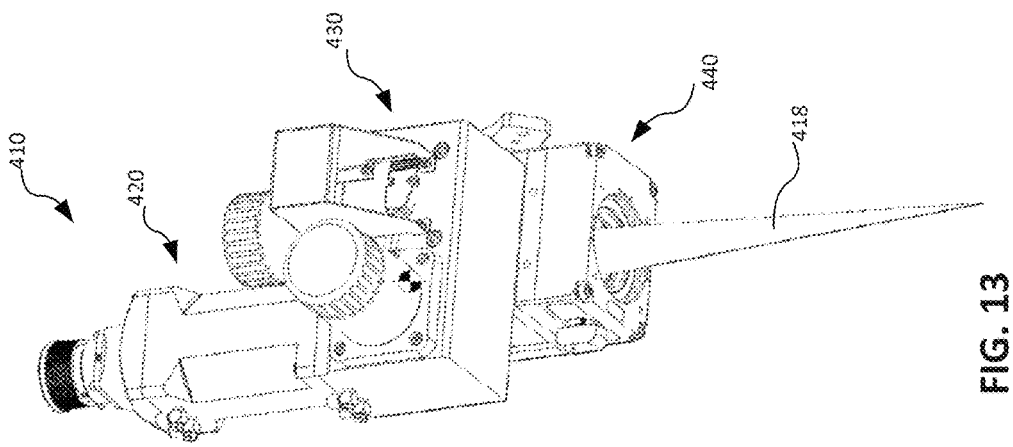

FIGS. 13 and 14 show the assembled laser welding head 410 with each of the modules 420, 430, 440 coupled together and emitting a focused beam 418. A laser beam coupled into the collimator module 420 is collimated and the collimated beam is directed to the wobbler module 430. The wobbler module 430 moves the collimated beam using the mirrors and directs the moving collimated beam to the core block module 440. The core block module 440 then focuses the moving beam and the focused beam 418 is directed to a workpiece (not shown).

Figure 15:
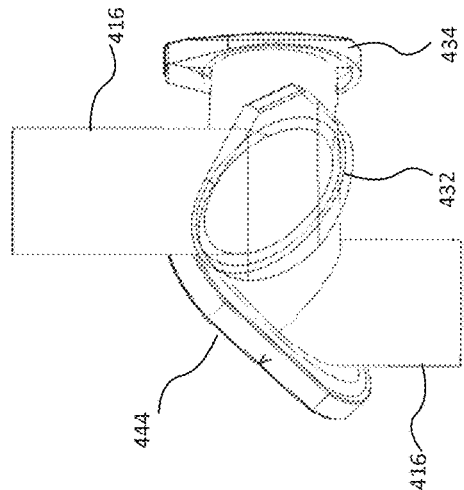
FIG. 15 is a schematic diagram of the beam path within the laser welding head shown in FIGS. 13 and 14.

FIG. 15 shows the path of a collimated beam 416 inside of the wobbler module 430 and the core block module 440 when coupled together. As shown, the collimated beam 416 input to the wobbler module is reflected from the first galvo mirror 432 to the second galvo mirror 434 and then reflected from the fixed mirror 444 inside the core block module and output from the core block module. The fixed mirror 444 may be an infrared mirror to allow use with a camera for monitoring the beam 416.

Figure 16:
FIG. 16 is a schematic block diagram of a laser welding head with dual movable mirrors and diffractive optics, consistent with an embodiment of the present disclosure.
Figure 16:
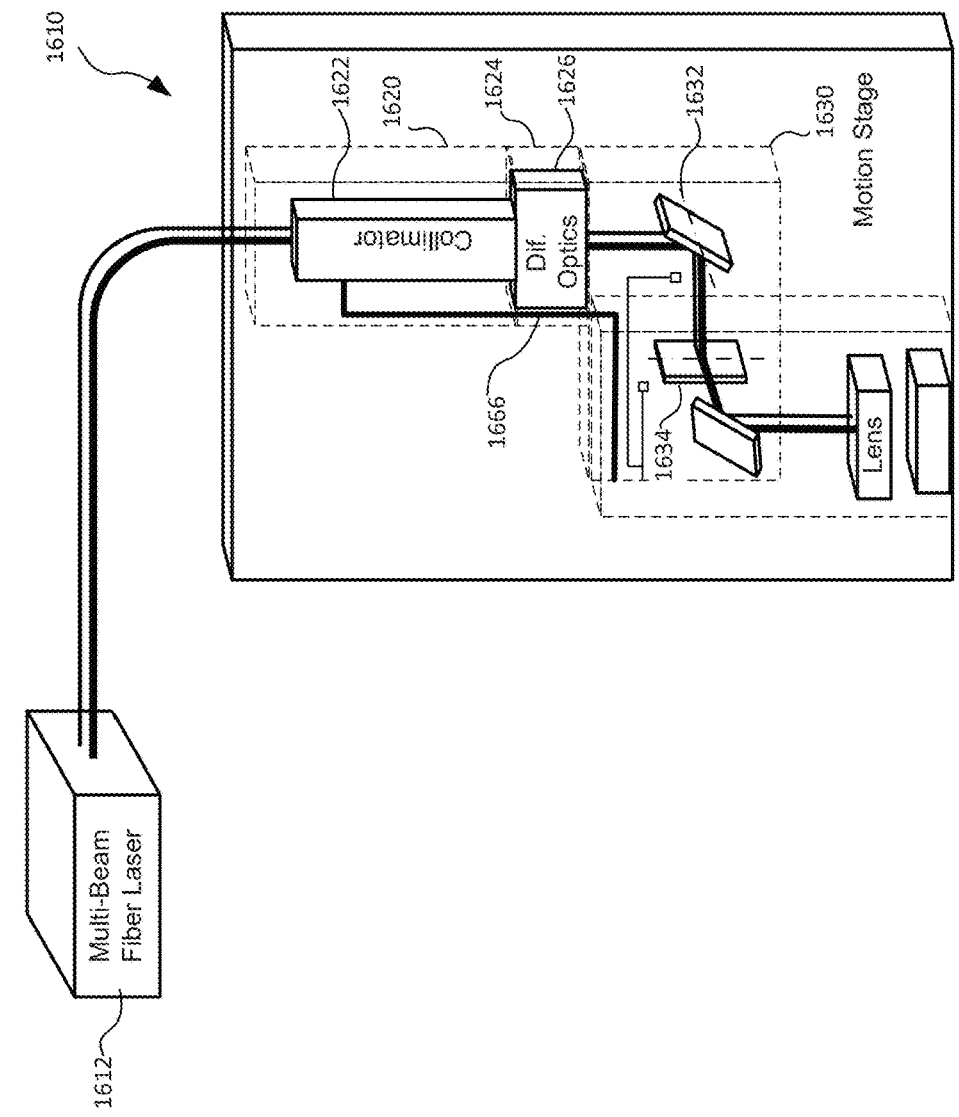

Referring to FIG. 16, further embodiments of a laser welding head 1610 with movable mirrors and a laser welding system are described in greater detail. This embodiment of the laser welding head 1610 further includes at least one beam shaping diffractive optical element 1626 for shaping the beam. The beam shaping diffractive optical element 1626 is located between a collimator 1622 and movable mirrors 1632, 1634 in the welding head 1610. The beam shaping diffractive optical element 1626 shapes the collimated beam and the shaped beam is then moved by the mirrors 1632, 1634, for example, as described above.

Figure 17A:
FIGS. 17A and 17B illustrate a circular beam spot and a shaped rectangular beam spot produced by diffractive optics, respectively.
Figure 17B:
Figure 17C:
FIG. 17C illustrates a donut-shaped beam spot produced by beam shaping optics.

One example of the beam shaping diffractive optical element 1682 includes a top hat beam shaping element that receives an input beam with a Gaussian profile and circular beam spot, as shown in FIG. 17A, and produces a shaped beam with a uniform square or "top hat" profile and a rectangular or square beam spot, as shown in FIG. 17B. Other beam shaping diffractive optical elements may include, without limitation, a diffractive beam splitting element that converts an input beam into a 1 or 2 dimensional array of beamlets, a ring generator element that shapes an input beam into a ring or a series of rings, and a diffractive vortex lens that shapes an input beam into a donut-shaped ring, as shown in FIG. 17C.

Figure 18A:
FIGS. 18A-18C illustrate rectangular beam spots of different sizes produced by different diffractive optics.
Figure 18B:
Figure 18C:

Different beam shaping diffractive optical elements 1626 may thus be used providing different shapes and/or sizes of beams. A donut shaped beam spot may also have a more uniform power distribution by eliminating a high power concentration at the center of the beam. As shown in FIGS. 18A-18C, different diffractive optical elements may provide rectangular beams having different sizes, thereby enabling different "brush sizes" and resolutions for welding and other applications. Smaller beam spots or "brush sizes" may be used, for example, for smaller areas or around edges where a higher resolution is desired.

In an embodiment, the beam shaping diffractive optical element 1626 is located in a beam shaping module 1624, which may be removably positioned between a collimator module 1620 and a wobbler module 1630, for example, as described above. Thus, beam shaping modules 1624 with different diffractive optics may be used interchangeably in the welding head 1610. The beam shaping module 1624 may also provide a safety interlock path 1666 as described above.

Figure 20:
FIG. 20 illustrates a pattern of shaped beam spots produced by a multi-beam fiber laser coupled to a laser welding head including diffractive optics, consistent with embodiments of the present disclosure.
Figure 19:
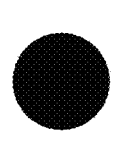
FIG. 19 illustrates a pattern of beam spots produced by a multi-beam fiber laser coupled to a laser welding head, consistent with embodiments of the present disclosure.

In yet another embodiment, the welding head 1610 may be coupled to a multi-beam fiber laser 1612 capable of selectively delivering multiple beams. One example of a multi-beam fiber laser is described in greater detail in International Application No. PCT/US2015/45037 filed 13 Aug. 2015 and entitled Multibeam Fiber Laser System, which is fully incorporated herein by reference. In one embodiment, a Ytterbium fiber laser provides an output of 1070 nm but any variety of wavelengths is contemplated, such that Er, Th, Ho, doped fibers, or some combination thereof, are contemplated not to mention fiber lasers in which the output is frequency shifted by virtue of non-linear optical crystals, Raman fibers and the like. The multiple beams may have different characteristics such as different modes, powers, energy densities, profiles and/or sizes. FIG. 19, for example, shows multiple beams having different sizes. Multiple beams may be delivered at the same time or individual beams with different characteristics may be delivered separately and selectively at different times to provide different operations (e.g., heating, welding, and post-processing). Multiple beams may also be shaped by the diffractive optics 1626 to produce multiple shaped beams, for example, as shown in FIG. 20. The shape and/or size of multiple beams may thus be changed for different operations or applications using the multi-beam fiber laser 1612 and/or different diffractive optical elements 1626. For some welding applications, for example, one or more beams may be shaped in a ring or donut shape to provide more uniform power distribution.

Accordingly, a laser welding head with movable mirrors, consistent with embodiments described herein, allows improved control over the movement, size, and/or shape of a laser beam used for various welding applications. Embodiments of the laser welding head with movable mirrors and the welding systems and methods described herein may thus be used to form stronger, smoother and more uniform welds.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser welding method comprising:
   generating a laser beam from a laser;
   collimating the laser beam in a welding head;
   reflecting the collimated laser beam from at least one movable mirror in the welding head and moving the at least one movable mirror to move the beam relative to a workpiece, wherein the movement is only within a limited field of view defined by a scan angle of about 1-2°; and
   focusing the moving beam on the workpiece to perform welding.

2. The laser welding method of claim 1 further comprising moving at least one of the laser welding head and the workpiece relative to each other while moving the beam with the movable mirror.

3. The laser welding method of claim 1 wherein the at least one movable mirror includes at least two movable mirrors for moving the beam in at least two different axes.

4. The laser welding method of claim 1 further comprising controlling movement of the at least one movable mirror such that the beam moves with a wobble pattern on the workpiece during welding.

5. The laser welding method of claim 1 wherein at least a portion of the workpiece being welded is Aluminum.

6. The laser welding method of claim 1 wherein generating the laser beam includes generating a laser beam in a near infrared spectral range from an Ytterbium fiber laser.

7. The laser welding method of claim 1 wherein generating the laser beam includes generating a laser beam from a fiber laser with an active fiber selected from the group consisting of Er, Th, Ho, doped fibers, and combinations thereof.

8. The laser welding method of claim 1 further comprising controlling movement of the at least one moveable mirror such that the beam follows a seam to be welded.

9. The laser welding method of claim 8 further comprising detecting a location of the seam to be welded in advance of the seam, and wherein movement is controlled to adjust a position of the beam in response to the detected location of the seam to be welded.

10. The laser welding method of claim 9 further comprising controlling movement of at least one movable mirror such that the beam moves with a wobble pattern over the seam to be welded.

11. The laser welding method of claim 1 further comprising shaping the collimated beam.

12. The laser welding method of claim 11 wherein shaping the laser beam includes passing the collimated laser beam through diffractive optics.

13. The laser welding method of claim 1 further comprising adjusting laser power in response to movement and/or a position of the beam.

14. The laser welding method of claim 1 further comprising causing the laser to shut off in response to sensing a condition proximate the at least one movable mirror.

15. The laser welding method of claim 14 wherein the sensed condition is a thermal condition.

16. The laser welding method of claim 1 further comprising delivering gas to a weld site from a gas assist accessory mounted on the laser welding head.

17. A laser welding method comprising:
generating a laser beam from a laser;
collimating the laser beam in a laser welding head;
moving the collimated beam relative to a workpiece with a wobble pattern in a limited field of view defined by a scan angle of about 1-2°, the wobble movement generated within the laser head in first and second axes;
focusing the moving beam on the workpiece as the beam moves with the wobble pattern, the focusing of the moving beam performed within the laser head after moving the beam; and
moving at least one of the laser welding head and the workpiece relative to each other while moving the beam on the workpiece in the wobble pattern to perform welding.

18. The laser welding method of claim 17 wherein the wobble pattern is selected from a group consisting of a circular pattern and a figure 8 pattern.

19. A laser welding method comprising:
providing a laser for generating a laser beam;
providing a laser welding head for collimating the laser beam in a laser welding head, moving the collimated beam relative to a workpiece with a wobble pattern in a limited field of view defined by a scan angle of about 1-2°, and focusing the moving beam on the workpiece as the beam moves with the wobble pattern; and
providing at least one motion stage for moving at least one of the laser welding head and the workpiece relative to each other while moving the beam on the workpiece in the wobble pattern.

\* \* \* \* \*